Patented Sept. 26, 1939

2,173,920

UNITED STATES PATENT OFFICE 2,173,920

AZO DYESTUFF AND PROCESS FOR MAKING SAME

Alfred Siegel, Roselle, N. J., assignor to E. I. du Pont de Nemours & Company, Wilmington, Del., a corporation of Delaware No Drawing. Application February 10, 1937, Serial No. 125,119

4 Claims. (Cl. 260—197)

This invention relates to a new azo dyestuff and process for producing the same. More particularly the invention concerns the production of an insoluble azo dyestuff suitable for use as a pigment.

In one specific embodiment, the invention contemplates the production of a light maroon or dark bluish red azo dye by combining diazotized meta nitro para anisidine (3-nitro-4-aminoanisol) with beta naphthol, whereby a water-insoluble azo dye of excellent durability, high tinctorial power, and improved shade purity results.

The production of a commercially satisfactory, maroon-colored azo dye has met with considerable difficulty. This for the reason that such dyes are peculiarly prone to rapid fading because of poor light stability and lack of durability, especially when exposed to outside influences. These undesirable characteristics manifest themselves particularly when the dyes are employed as essential ingredients in coating composition vehicles, such as nitrocellulose lacquers, linseed oil paints and enamels. Prior efforts at the obtainment of a commercially satisfactory azo dye of maroon color, such as through the combination of ortho or meta nitro anisidines (for example, 5 nitro-2-amino or 3-nitro-5-amino or 4-nitro-2-amino anisol) with beta naphthol, have not provided the essential and requisite characteristics necessary to the production of a commercially satisfactory dye. Accordingly, the production of maroon pigments exhibiting distinct shade purity in combination with durability has proved a decided need and long-felt want in the art.

I have made the surprising and unexpected discovery that a commercially satisfactory and highly improved azo dye suitable for use as a pigment is obtainable by combining specifically beta naphthol with diazotized meta nitro para anisidine, and that such dye exhibits a pronounced and decided improvement over its isomeric combinations with beta naphthol, particularly in respect to combined high tinctorial shade and durability. I have found further that these desired and combined properties will particularly manifest themselves when my novel dye is employed in enamel coating compositions such as the alkyd resins, or in nitrocellulose lacquers or linseed oil paints. By alkyd resin enamels, I refer to the condensation products of glycerol and phthalic anhydride, as for instance, those disclosed in United States Patent No. 1,885,024 of October 25, 1932 to William W. Lewers and Gordon D. Patterson.

It is among the objects of the present invention, therefore, to provide an insoluble azo dye of novel and pleasing shade, having the desired combination of a shade which has long been sought, together with a very high degree of durability, as well as high tinctorial power. It is a further object of my invention to provide a commercially satisfactory pigment which exhibits pronounced durability and gloss, even after prolonged and continued exposure to the atmospheric elements. An additional object involves the provision of an azo dye admirably suited for use as a commercial pigment, especially in synthetic resin vehicles of the alkyd or glyptal resin variety, in the production of light maroon enamels, as well as in other coating composition vehicles, such as nitrocellulose lacquers and linseed oil. Other objects and advantages of the invention will be apparent from the ensuing description.

In one preferred and particular embodiment of my invention, I first prepare a suitable mixture of meta nitro para anisidine (3-nitro-4-amino-1-anisol) (4-methoxy-2-nitro-anilin) and water, and then pulp the same, preferably to a creamy consistency. I then dilute and diazotize this mixture with hydrochloric acid and sodium nitrite in the usual and conventional manner. I then run the diazo mixture obtained into a suitable and separately prepared solution of beta naphthol, subjecting the resultant mixture to agitation and stirring. The dyestuff, if in its pure or "toner" state, or precipitated on substrata if in its lake form, may then be recovered after the usual filtering, washing and drying. The dye may then be employed or used as a pigment in the usual and well-known vehicles, either directly, or with common inorganic substances as substrata, such as aluminum hydrate, blanc fixe, etc., or combinations of each.

In order that the invention may be more clearly understood, the following specific examples are given, it being apparent that variance may be made therefrom without departing from the underlying principle and scope of my invention:

Example I

A mixture of 168 parts of meta nitro para anisidine and 480 parts of water is pulped until a creamy paste is obtained. This paste is diluted with an additional 2000 parts of water and diazotized in the usual manner with 110 parts of hydrochloric acid (100%) and 71 parts of sodium nitrite and the diazo preparation is allowed to stir for 1 hour maintaining an excess of nitrous acid thruout.

In a separate container a solution of 150 parts of beta naphthol and 48 parts of caustic soda is prepared and made to a volume corresponding to 9000 parts of solution with cold water. To this solution is added a suspension of 3.2 parts of para soap in 32 parts of water and the mixture stirred for 5 minutes. There is then added quickly a solution of 70.5 parts of acetic acid (100%) in 500 parts of water. After stirring a few minutes, 300 parts of solid sodium bicarbonate is added and the whole suspension adjusted to a volume corresponding to 14,000 parts at a temperature of 25° C. The diazo preparation is then added during a period of 1 hour and the dyestuff is stirred for another hour. The product is filtered, washed, and dried in the usual manner.

The yield is 325 parts of the water insoluble, light maroon or dark red shade dyestuff.

*Example II*

23 parts of the pigment prepared as in Example 1, 205 parts of a mixture of drying oil modified alkyd resins (50–55% solids, dissolved in a suitable solvent), 80 parts of a mixture of thinners and solvents (mineral spirits and toluene) and 2.5 parts of cobalt drier are ground in the usual manner in a ball mill until a satisfactory dispersion is obtained.

The resulting enamel has a highly desirable light maroon or dark red shade and exhibits a very high degree of durability when used as a coating composition exposed to the elements.

It is obvious that in the production of an enamel many of its properties will depend upon the vehicle employed and that any of a wide variety of alkyd and other synthetic resins, as well as the raw and bodied natural drying oils, may be used in lieu of those set out in Example II with suitable and desired variations in the proportions of ingredients. That this is true will be evident and recognized at once by those conversant with the manufacture of coating compositions.

I claim as my invention:

1. An azo dyestuff consisting of the combination of diazotized meta-nitro-para-anisidine with beta naphthol.

2. A water-insoluble maroon colored pigment of high tinctorial power and durability, formed by combining diazotized meta-nitro-para-anisidine and beta naphthol, and being suitable for incorporation into paints, varnishes, enamels and lacquers.

3. As a new azo pigment, coupled beta naphthol and meta-nitro-para-anisidine.

4. As an essential ingredient of a coating composition, the insoluble dyestuff formed by the combination of diazotized meta nitro para anisidine with beta naphthol.

ALFRED SIEGEL.